United States Patent
Eswara et al.

(10) Patent No.: US 8,475,050 B2
(45) Date of Patent: Jul. 2, 2013

(54) SYSTEM AND METHOD FOR OBSTACLE DETECTION USING FUSION OF COLOR SPACE INFORMATION

(75) Inventors: Lalitha M. Eswara, Bangalore (IN); Lokesh Rayasandra Boregowda, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 792 days.

(21) Appl. No.: 12/631,954

(22) Filed: Dec. 7, 2009

(65) Prior Publication Data

US 2011/0135147 A1 Jun. 9, 2011

(51) Int. Cl.
*G06K 9/34* (2006.01)

(52) U.S. Cl.
USPC .......................................... 384/164; 382/173

(58) Field of Classification Search
None
See application file for complete search history.

(56) References Cited

U.S. PATENT DOCUMENTS

| | | | | |
|---|---|---|---|---|
| 4,718,089 | A * | 1/1988 | Hayashi et al. | 382/164 |
| 6,985,179 | B2 * | 1/2006 | Martins et al. | 348/227.1 |
| 7,020,329 | B2 | 3/2006 | Prempraneerach et al. | |
| 7,248,750 | B2 * | 7/2007 | Matsumoto | 382/275 |
| 7,248,968 | B2 | 7/2007 | Reid | |
| 7,453,497 | B2 * | 11/2008 | Martins et al. | 348/222.1 |
| 7,539,327 | B2 | 5/2009 | Toyama | |
| 7,580,549 | B2 * | 8/2009 | Wei et al. | 382/104 |
| 7,595,820 | B2 * | 9/2009 | Martins et al. | 348/227.1 |
| 7,606,414 | B2 | 10/2009 | Boregowda et al. | |
| 7,804,980 | B2 * | 9/2010 | Sasaki | 382/103 |
| 7,978,917 | B2 * | 7/2011 | Lei et al. | 382/224 |
| 2006/0039603 | A1 * | 2/2006 | Koutsky | 382/165 |
| 2008/0065287 | A1 | 3/2008 | Han et al. | |
| 2009/0021609 | A1 * | 1/2009 | Luo et al. | 348/241 |
| 2009/0202107 | A1 | 8/2009 | Wilson | |
| 2010/0007764 | A1 * | 1/2010 | Martins et al. | 348/222.1 |
| 2011/0002541 | A1 * | 1/2011 | Varekamp | 382/173 |
| 2011/0243431 | A1 * | 10/2011 | Sangappa et al. | 382/164 |

OTHER PUBLICATIONS

"Vision Based obstacle detection and avoidance for the CWRU cutter Autonomous lawnmower" Nov. 2009, Technologies for Practical Robot Applications, 2009, TePRA 2009, IEEE International Conference on.*

"Obstacle Avoidance System for Autonomous Transportation Vehicle based on Image Processing" International Commission of Agricultural Engineering 2002.*

Lorigo et al "Visually-Guided obstacle Avoidance in Unstructured Environments" Proceedings of the IEEE conference on Intelligent Robots and systems 1997.*

(Continued)

*Primary Examiner* — Chan S Park
*Assistant Examiner* — Sean Motsinger
(74) *Attorney, Agent, or Firm* — Fogg & Powers LLC

(57) ABSTRACT

A method comprises receiving an image of the area, the image representing the area in a first color space; converting the received image to at least one second color space to produce a plurality of converted images, each converted image corresponding to one of a plurality of color sub-spaces in the at least one second color space; calculating upper and lower thresholds for at least two of the plurality of color sub-spaces; applying the calculated upper and lower thresholds to the converted images corresponding to the at least two color sub-spaces to segment the corresponding converted images; fusing the segmented converted images corresponding to the at least two color sub-spaces to segment the received image; and updating the segmentation of the received image based on edge density data in the received image.

20 Claims, 3 Drawing Sheets

OTHER PUBLICATIONS

Kiss et al., "A Universal Vision-Based Navigation System for Autonomous Indoor Robots", 2003, Publisher: Hugarian Fund for Scientific Research.

Lenser et al., "Visual Sonar: Fast Obstacle Avoidance Using Monocular Vision", "IEEE/RSJ International Conference on Intelligent Robots and Systems", Mar. 16, 2003, Published in: Las Vegas, Nevada.

Lorigo et al., "Visually-Guided Obstacle Avoidance in Unstructured Environments", "Proceedings of IROS 1997", Sep. 1997, pp. 373-379, Published in: Grenoble, France.

Sofman et al., "Terrain Classification From Aerial Data to Support Ground Vehicle Navigation", Dec. 2, 2008.

Sural et al., "Segmentation and Histogram Generation Using the HSV Color Space for Image Retrieval", "IEEE ICIP 2002", 2002.

Ulrich et al., "Appearance-Based Obstacle Detection With Monocular Color Vision", "Proceedings of the AAAI National Conference on Artifical Intelligence", Jul./Aug. 2000, Published in: Austin, TX.

* cited by examiner

SYSTEM AND METHOD FOR OBSTACLE DETECTION USING FUSION OF COLOR SPACE INFORMATION

BACKGROUND

Vision based scene understanding has been used in various systems. Based on such an understanding of the scene, a variety of applications can be derived. One such application is vision based obstacle detection that can help in enabling robotic vision based systems and autonomous ground vehicles. Perception of obstacles and avoidance of obstacles is particularly important in autonomous vehicles. Some typical autonomous vehicle/navigation systems include applications related to perimeter following, navigation in unknown terrains, autonomous vehicles on the road, navigation in cluttered environments etc. These situations often include challenging and complex scenarios requiring hybrid sensor usage such as laser, GPS and wireless sensors. Vision sensor (camera) systems are used to supplement other sensors in these situations.

SUMMARY

In one embodiment, a method for detecting obstacles in an area is provided. The method comprises receiving an image of the area, the image representing the area in a first color space; converting the received image to at least one second color space to produce a plurality of converted images, each converted image corresponding to one of a plurality of color sub-spaces in the at least one second color space; calculating upper and lower thresholds for at least two of the plurality of color sub-spaces; applying the calculated upper and lower thresholds to the converted images corresponding to the at least two color sub-spaces to segment the corresponding converted images; fusing the segmented converted images corresponding to the at least two color sub-spaces to segment the received image; and updating the segmentation of the received image based on edge density data in the received image.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
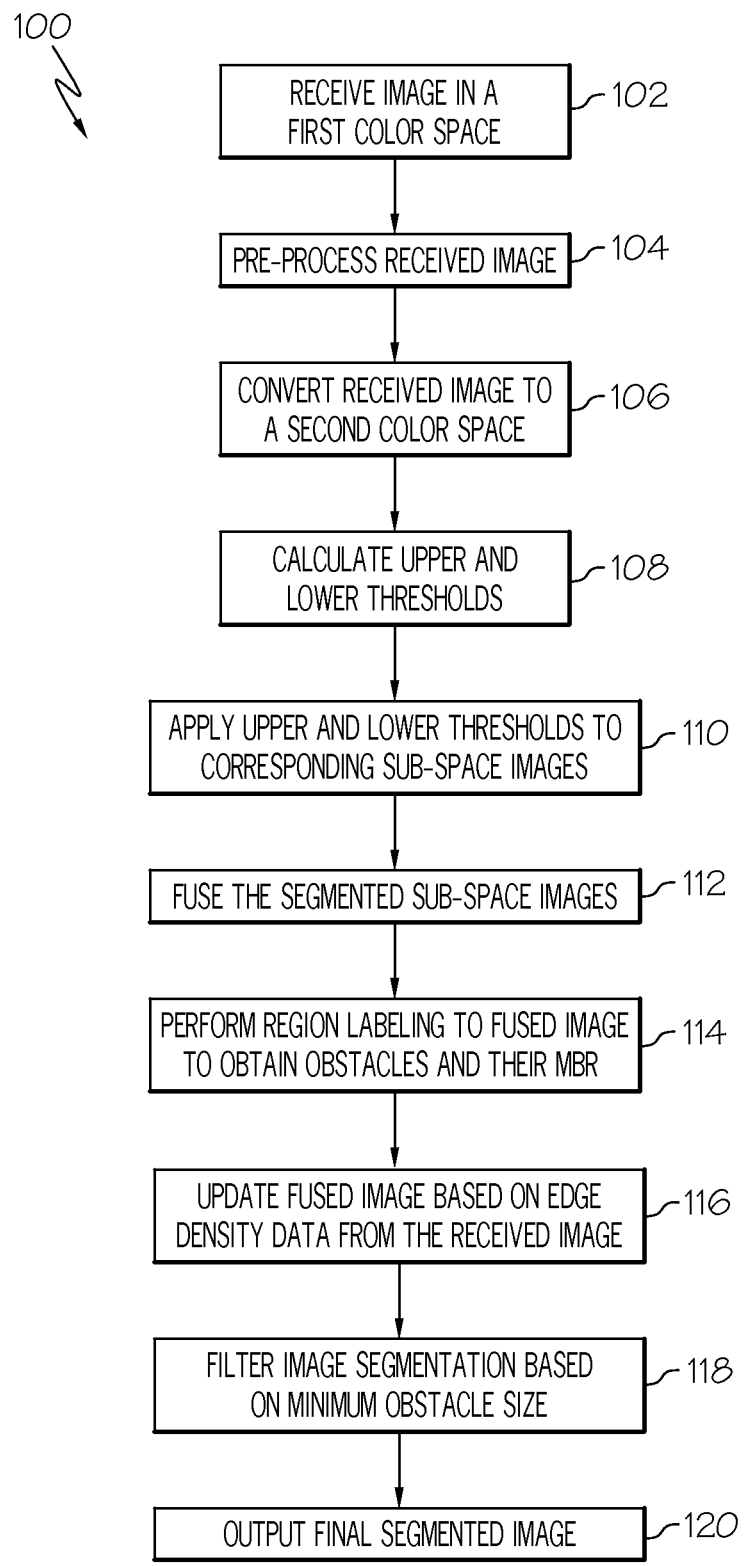
FIG. 1 is a flow chart depicting an exemplary embodiment of a method of detecting obstacles.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

FIG. 1 is a flow chart depicting an exemplary embodiment of a method 100 of detecting obstacles. At block 102, an image of a scene is received from a sensor. As used herein, the term "scene" refers to an image of an area at a given moment in time. The image sensor is a monocular color camera which provides the image in a first color space, such as Red/Green/Blue (RGB) color space. At block 104, the received image is pre-processed. In particular, pre-processing the image includes, but is not limited to, smoothing the received image using any appropriate low-pass filter.

At block 106, the received image is converted to a second color space, such as Hue/Saturation/Value (HSV) color space, luminance/chrominance (YUV) color space, or Hue/Saturation/Lightness (HSL) color space. The HSV, YUV, and HSL color spaces are known to one of skill in the art. In some embodiments, converting the received image to a second color space includes converting the received image to more than one second color space. For example, in this embodiment, the received image is converted to both HSV and YUV color spaces. At block 108, upper and lower thresholds are calculated for at least one sub-space of each second color space. In this exemplary embodiment, upper and lower thresholds are calculated for each of the Hue (H) and Saturation (S) sub-spaces of the HSV color space as well as for the U chrominance sub-space of the YUV color space.

An exemplary method for calculating upper and lower thresholds for each sub-space is described in more detail below with respect to FIG. 2. A sub-space, as used herein, refers to a component of the color space. In addition, converting the received image to a second color space produces a separate converted image for each of the sub-spaces in the one or more second color spaces. The resulting converted images are also referred to herein as sub-space images. A copy of the original received image is also preserved in some embodiments.

At block 110, the calculated upper and lower thresholds are applied to the corresponding sub-space image. In particular, pixels which fall between the upper and lower thresholds are designated as background pixels. Pixels which fall either above the upper threshold or below the lower threshold are designated as obstacle pixels. In this example, pixels are designated as background pixels by assigning the pixels a value of zero. In this example, pixels are designated as obstacle pixels by assigning the corresponding pixels a value of "255". Hence, in this example, a binary (e.g. two intensities) sub-space image results.

At block 112, each segmented sub-space image is fused with other segmented sub-space images using, for example, a logical OR operation to segment the original received message. In particular, pixels identified as obstacle pixels in each sub-space image are correlated with corresponding pixels in the original received image to segment the original received image. Thus, information from multiple color sub-spaces (e.g. Hue and Saturation) is fused together to identify terrain and obstacles in the original received image. The resulting image is also referred to herein as a fused binary image or a fused image.

At block 114, connected component analysis is performed to obtain labeled regions corresponding to various obstacles in the fused image along with their Minimum Bounding Rectangle (MBR) information. The MBR is the minimum size bounding box which is able to enclose the detected obstacle. The MBR consists of four corners of the rectangle which encloses the detected obstacle. At block 116, the segmentation of the fused image is updated based on edge density information in the original received image. The edge density parameter is calculated based on edges present in each MBR. For example, the edge image can be obtained from the Y (luminance) color sub-space of the original received image. In particular, obstacles typically have more prominent edges than terrain or background. In other words, the density of obstacle edges within their Minimum Bounding Rectangle (MBR) is higher than the terrain. Thus, a density threshold is set such that pixels with an edge density below the threshold are considered part of the terrain or background. This use of edge density information helps reduce false positives in the detection of obstacles.

At block 118, the updated fused image (the segmented original received image) is filtered based on a pre-determined minimum obstacle size. Thus, a group of pixels identified as an obstacle that is smaller than the minimum obstacle size is filtered out such that the group of pixels is no longer identified as an obstacle in the final segmented image. The minimum obstacle size is determined a priori according to the requirements of the particular system. At block 120, the final segmented image of the original received image is output. The output, in some embodiments, is a binary segmented image. In other embodiments, the output is the original received image including a set of bounding boxes indicating the obstacle MBRs. For example, the final segmented image is output to a display unit in some embodiments. In other implementations, outputting the final segmented image comprises outputting control signals based on the final segmented image. The control signals cause one or more actuators to maneuver a vehicle to avoid the obstacles detected in the final segmented image.

Figure 2:
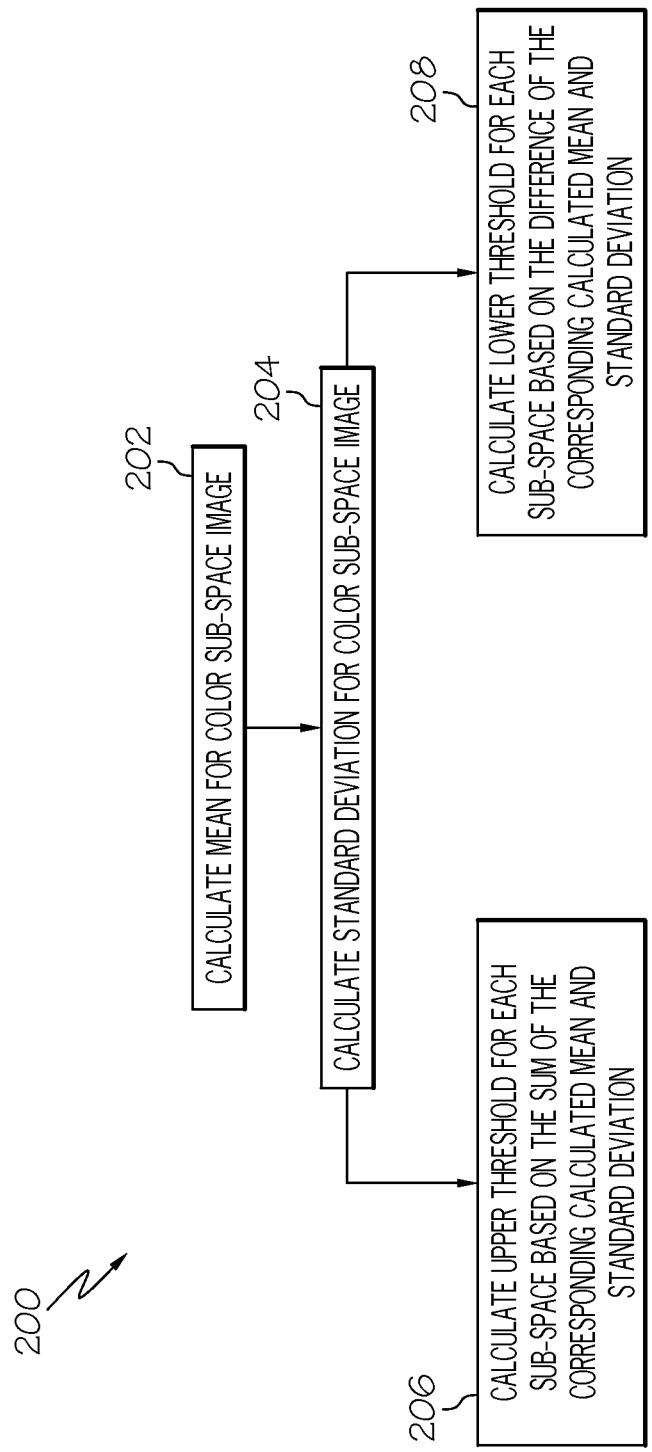
FIG. 2 is flow chart depicting an exemplary embodiment of a method of calculating adaptive thresholds.

FIG. 2 is a flow chart depicting an exemplary method 200 of calculating thresholds for each sub-space image. At block 202, a mean pixel value is calculated for the sub-space image. At block 204, a standard deviation from the mean pixel value is calculated. At block 206, an upper threshold is calculated by combining the mean and standard deviation. Equation 1 below is one exemplary equation for calculating the upper threshold.

Eq. 1

$$Th1 = mean + N*sd_i.$$

In equation 1, Th1 is the upper threshold and sd is the calculated standard deviation. The value N represents the number of standard deviations to include and can be changed according to the requirements of the specific implementation. For example, in some implementations, N is assigned the value "3". A similar equation, such as exemplary equation 2 below, can be used to calculate the lower threshold at block 208.

Eq. 2

$$Th1 = mean - N*sd$$

It is to be understood that Equations 1 and 2 are provided by way of example only and that other equations based on the mean and standard deviation can be used to calculate the upper and lower thresholds. By calculating the thresholds based on the mean and standard deviation, the thresholds adapt to the environment. Thus, systems employing the methods described above can adapt to varying terrains without a need to customize or re-tune the methods.

Figure 3:
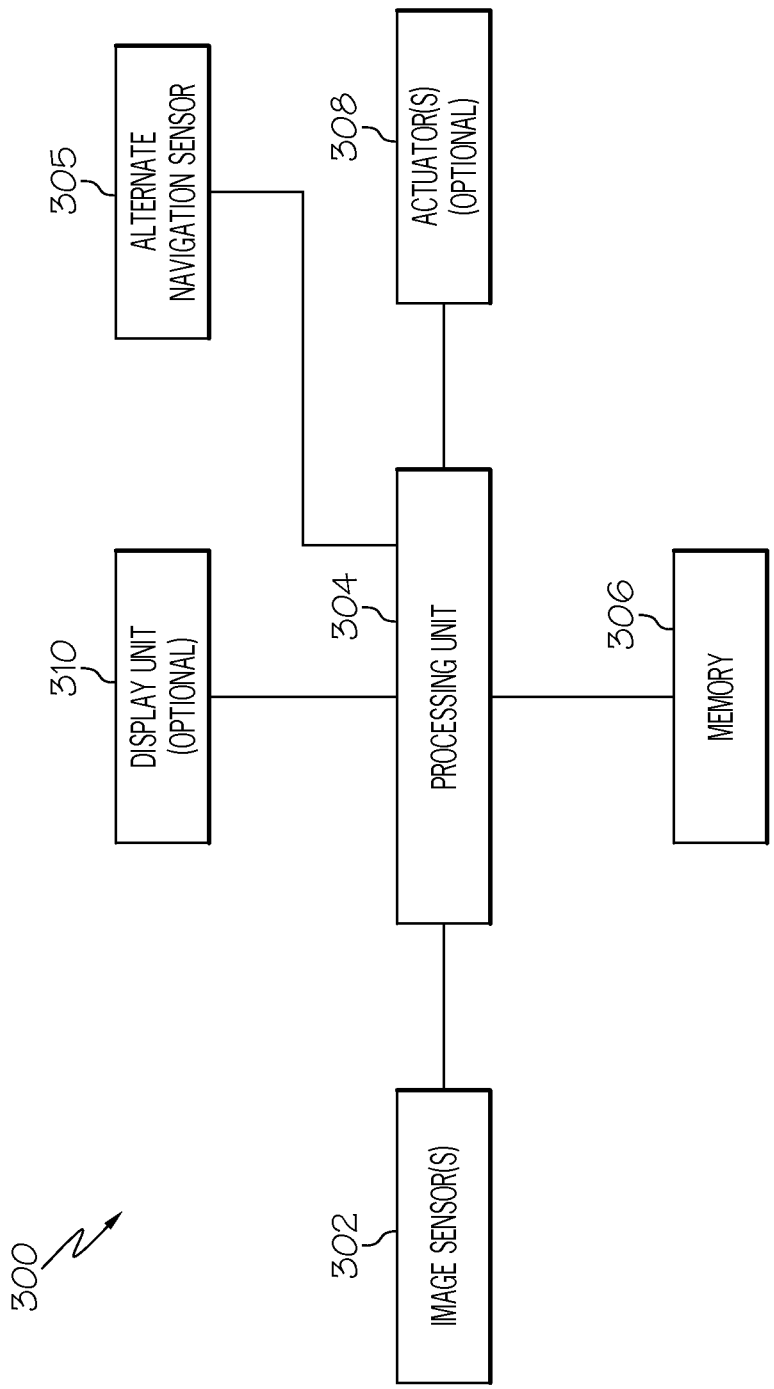
FIG. 3 is a block diagram of an exemplary embodiment of a navigation system.

FIG. 3 is a block diagram of an exemplary system 300 which implements the methods described above. System 300 includes an image sensor 302 coupled to a processing unit 304. The sensor 302 is operable to provide an image to the processing unit 304. Any appropriate image sensor, such as monocular or stereo color cameras, can be used. The processing unit 304 analyzes the received image to identify obstacles in the scene. In particular, the processing unit 304 converts the received image to one or more second color spaces, as described above. The processing unit 304 also calculates upper and lower thresholds as described above with respect to FIG. 2. The processing unit 304 uses the calculated thresholds to segment the received image as described above with respect to FIG. 1. In addition, the processing unit 304 updates and filters the segmented image to reduce false positives as described above.

The processing unit 304 can be implemented using software, firmware, hardware, or any appropriate combination thereof, as known to one of skill in the art. For example, the processing unit 304 can include or interface with hardware components and circuitry that support the detection of obstacles using the layered approach described above with respect to FIG. 1. By way of example and not by way of limitation, these hardware components can include one or more microprocessors, memory elements, digital signal processing (DSP) elements, interface cards, and other standard components known in the art. Any of the foregoing may be supplemented by, or incorporated in, specially-designed application-specific integrated circuits (ASIC) and field programmable gate arrays (FPGA).

In one implementation of the embodiment shown in FIG. 3, at least a portion of the processing unit 304 is implemented in software that executes on a suitable programmable processor. For example, such a programmable processor can be implemented using a digital signal processor (DSP). that executes software. Such software comprises a plurality of program instructions tangibly embodied on a processor-readable medium such as memory 306. In other examples, the programmable processor is a part of another type of programmable device such as an ASIC or FPGA.

The memory 306 can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In some embodiments, the processing unit 304 also estimates motion by matching detected obstacles from the current scene to the corresponding detected obstacles in a previous scene stored in the memory 306. For example, in some embodiments, processing unit 304 uses techniques such as, but not limited to, Scale-invariant feature transform (SIFT), Speeded Up Robust Features (SURF), or other correlation techniques as known to one of skill in the art. Hence, in this embodiment, processing unit 304 utilizes the detected obstacles for visual odometry. However, in other embodiments, processing unit 304 is operable to use the detected obstacles for other navigation tasks, such as, but not limited to, integration of the observed scenes with map data to minimize misalignment of map data to the real world, and automatic map construction based on the observed scenes using techniques known to one of skill in the art.

Additionally, in this embodiment, system 300 includes a display unit 310 and one or more actuators 308. However, it is to be understood that, in other embodiments, one or both of display unit 310 and actuators 308 are omitted. Display unit 310 is operable to display navigation data to a user. For example, if the detected obstacles are used to estimate motion, the calculated position and orientation of system 300 is displayed to the user. Alternatively, if the detected obstacles are used for map generation, the generated map is displayed to the user. Suitable display units include, but are not limited to, various CRT, active and passive matrix LCD, and plasma display units.

In some embodiments, processing unit 304 uses the position of the detected obstacles from the segmented image and the estimated motion calculation to determine the necessary actions to take in order to reach a programmed destination and/or avoid the detected obstacles. In some such embodiments, processing unit 304 generates control signals which are sent to actuators 308 to control the movement of a vehicle in which system 300 is located. For example, processing unit 304 can control the motion of an autonomous vehicle based on control signals transmitted to movement actuators (such as, but not limited to, brakes, accelerators, steering drive shafts, etc.) in the autonomous vehicle.

In other embodiments, the estimated motion calculation and/or the position of the detected obstacles is used for fusion with data from other sensors, such as alternate navigation sensor 305, in order to achieve improved reliability and/or accuracy. For example, alternate navigation sensor 305 can be implemented as, but is not limited to, an inertial measurement unit (IMU), inertial navigation system (INS), attitude and heading reference system (AHRS), or other system enhanced by an optical subsystem.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method for detecting obstacles in an area, the method comprising:
   receiving an image of the area, the image representing the area in a first color space;
   converting the received image to at least one second color space to produce a plurality of converted images, each converted image corresponding to one of a plurality of color sub-spaces in the at least one second color space;
   calculating upper and lower thresholds for at least two of the plurality of color sub-spaces;
   applying the calculated upper and lower thresholds to the converted images corresponding to the at least two color sub-spaces to segment the corresponding converted images;
   fusing the segmented converted images corresponding to the at least two color sub-spaces to segment the received image; and
   updating the segmentation of the received image based on edge density data in the received image;
   wherein the edge density data is determined based on edges identified in respective regions of the received image, each region enclosing a respective detected obstacle.

2. The method of claim 1, wherein the at least one second color space comprises one or more of Hue/Saturation/Value (HSV) color space, Luminance-chrominance (YUV) color space, or Hue/Saturation/Lightness (HSL) color space.

3. The method of claim 1, further comprising smoothing the received image prior to converting the received image to at least two second color spaces.

4. The method of claim 1, further comprising filtering the updated segmented image based on a minimum obstacle size.

5. The method of claim 1, wherein calculating the upper and lower thresholds for each of the at least two color sub-spaces comprises:
   determining a mean pixel value for the corresponding converted image;
   determining a standard deviation from the mean pixel value;
   calculating the upper threshold by summing the mean pixel value and a multiple of the standard deviation; and
   calculating the lower threshold by finding a difference between the mean pixel value and a multiple of the standard deviation.

6. The method of claim 1, wherein applying the calculated upper and lower thresholds to the converted images corresponding to the at least two color sub-spaces comprises:
   designating pixels with a value greater than the lower threshold and less than the upper threshold as background pixels; and
   designating pixels with a value greater than the upper threshold or less than the lower threshold as obstacle pixels.

7. The method of claim 1, wherein the edge density data is determined based on edges identified in each detected obstacle's Minimum Bounding Rectangle (MBR).

8. A system comprising:
   an image sensor to obtain an image of an area, the obtained image representing the area in a first color space; and
   a processing unit to convert the obtained image from the image sensor to at least one second color space;
   wherein converting the obtained image to at least one second color space produces a plurality of converted images, each of the plurality of converted images corresponding to one of a plurality of color sub-spaces in the at least one second color space;
   wherein the processing unit calculates upper and lower thresholds for at least two of the plurality of color sub-spaces, segments the converted images corresponding to the at least two color sub-spaces based on the corresponding upper and lower thresholds, segments the image obtained by the image sensor based on the at least two segmented converted images, and filters the segmented image obtained from the image sensor based on edge density data in the image obtained from the image sensor;
   wherein the processing unit determines the edge density data based on edges identified in respective regions of the received image, each region enclosing a respective detected obstacle.

9. The system of claim 8, wherein the processing unit converts the image obtained from the image sensor to one or more of Hue/Saturation/Value (HSV) color space, Luminance-chrominance (YUV) color space, or Hue/Saturation/Lightness (HSL) color space.

10. The system of claim 8, further comprising a display unit, wherein the processing unit outputs the filtered segmented image to the display unit.

11. The system of claim 8, further comprising one or more actuators, wherein the processing unit calculates control signals based, at least in part, on the filtered segmented image and outputs the control signals to the one or more actuators to control movement of a vehicle in which the processing unit and image sensor are located.

12. The system of claim 8, wherein the processing unit further filters the filtered segmented image based on a minimum obstacle size.

13. The system of claim 8, wherein the processing unit calculates the upper and lower thresholds for each of the at least two color sub-spaces by determining a mean pixel value of the corresponding converted image and a standard deviation from the mean pixel value;

wherein the processing unit calculates the upper threshold by summing a multiple of the standard deviation and the mean pixel value, and calculates the lower threshold by finding a difference between the mean pixel value and a multiple of the standard deviation.

14. The system of claim 8, wherein the processing unit applies the upper and lower thresholds to the converted images corresponding to the at least two color sub-spaces by designating pixels with a value greater than the lower threshold and less than the upper threshold as background pixels; and by designating pixels with a value greater than the upper threshold or less than the lower threshold as obstacle pixels.

15. The system of claim 14, wherein the processing unit segments the image obtained from the image sensor by correlating obstacle pixels in each of the converted images corresponding to the at least two color sub-spaces with pixels in the image obtained from the image sensor.

16. A program product comprising a non-transitory processor-readable medium on which program instructions are embodied, wherein the program instructions are operable, when executed by at least one programmable processor, to cause the programmable processor to:

convert a received image of an area from a first color space to at least one second color space to produce a plurality of converted images, each of the plurality of converted images corresponding to one of a plurality of color sub-spaces of the at least one second color space;

calculate an upper threshold and a lower threshold for each of at least two of the plurality of color sub-spaces;

apply the upper and lower thresholds to the converted images corresponding to the at least two color sub-spaces to segment the corresponding converted images;

fuse the segmented converted images corresponding to the at least two color sub-spaces to segment the received image; and update the segmentation of the received image based on edge density data in the received image;

wherein the edge density data is determined based on edges identified in respective regions of the received image, each region enclosing a respective detected obstacle.

17. The program product of claim 16, wherein the program instructions are further operable to cause the programmable processor to:

convert the received image from the first color space to one or more of Hue/Saturation/Value (HSV) color space, Luminance-chrominance (YUV) color space, or Hue/Saturation/Lightness (HSL) color space.

18. The program product of claim 16, wherein the program instructions are further operable to cause the programmable processor to:

calculate the upper and lower thresholds for each of the at least two color sub-spaces by determining a mean pixel value of the corresponding converted image and a standard deviation from the mean pixel value;

calculate the upper threshold by summing the standard deviation and a multiple of the mean pixel value; and calculate the lower threshold by finding a difference between the mean pixel value and a multiple of the standard deviation.

19. The program product of claim 16, wherein the program instructions are further operable to cause the programmable processor to filter the updated segmented image based on a minimum obstacle size.

20. The program product of claim 16, wherein the program instructions are further operable to cause the programmable processor to:

apply the upper and lower thresholds to the converted images by designating pixels with a value greater than the lower threshold and less than the upper threshold as background pixels, and by designating pixels with a value greater than the upper threshold or less than the lower threshold as obstacle pixels.

* * * * *